United States Patent [19]

Brooks

[11] 4,409,047
[45] Oct. 11, 1983

[54] METHOD OF MAKING A TOP TOOTHED ENDLESS POWER TRANSMISSION BELT CONSTRUCTION AND A BELT CONSTRUCTION MADE BY SUCH METHOD

[75] Inventor: Alden W. Brooks, Springfield, Mo.

[73] Assignee: Dayco Corporation, Dayton, Ohio

[21] Appl. No.: 357,242

[22] Filed: Mar. 10, 1982

[51] Int. Cl.³ .......................... B29H 7/22; F16G 1/00
[52] U.S. Cl. .................................. 156/138; 156/140; 156/142; 156/312; 264/226
[58] Field of Search ............... 156/140, 141, 142, 138, 156/137, 139, 312; 264/326, 347, 294; 425/28 B, 34 B

[56] References Cited

U.S. PATENT DOCUMENTS 3,078,206  2/1963  Skura .................................. 156/140
3,839,116  10/1974  Thomas et al. ...................... 156/140
4,106,966  8/1978  Brooks ............................... 156/138

Primary Examiner—Michael W. Ball
Attorney, Agent, or Firm—Joseph V. Tassone

[57] ABSTRACT

A method of making a top toothed endless power transmission belt construction that is formed mainly of polymeric material and a belt construction made by such method are provided, the method comprising the steps of disposing the material in substantially cylindrical form on a substantially cylindrical drum-like support member, disposing a substantially cylindrical toothed member about the disposed material, compressing one of the members toward the other of the members with the pressure of pressurized steam to form top teeth in the material and cure the thus formed material with the heat of the steam into a top toothed belt construction, introducing pressurized steam against the other member during part of the time that the one member is being compressed toward the other member by the pressure of the pressurized steam, and temporarily releasing the pressure on the one member before the polymeric material has been cured to permit the gas that has been initially heated and thereby expanded in the polymeric material to escape therefrom, and temporarily releasing the pressure against the other member at the same time that the pressure on the one member is released, the step of temporarily releasing the pressure against the other member ending after the step of temporarily releasing the pressure on the one member ends so that when the pressure on the one member is initially reapplied a maximum pressure differential exists across the one member and acts in a direction to compress one member toward the other member for a period of time before the pressure on the other member is initially reapplied.

18 Claims, 11 Drawing Figures

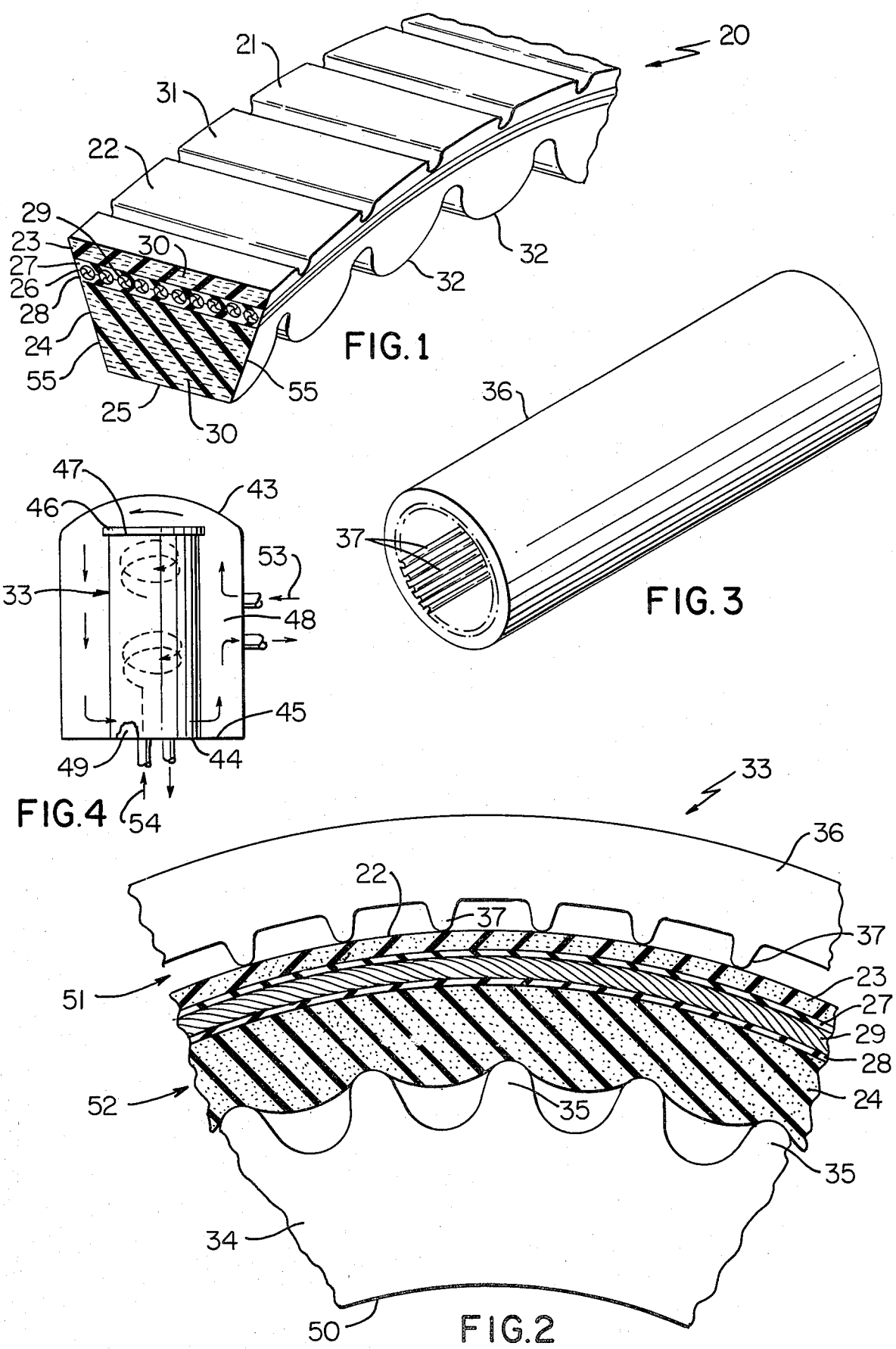

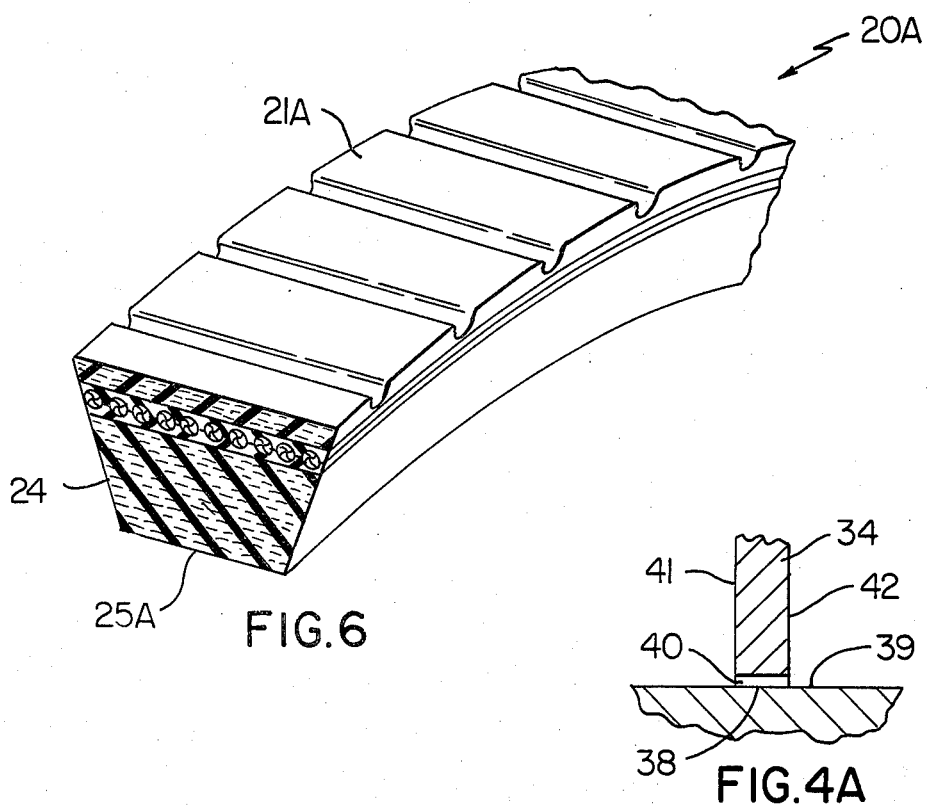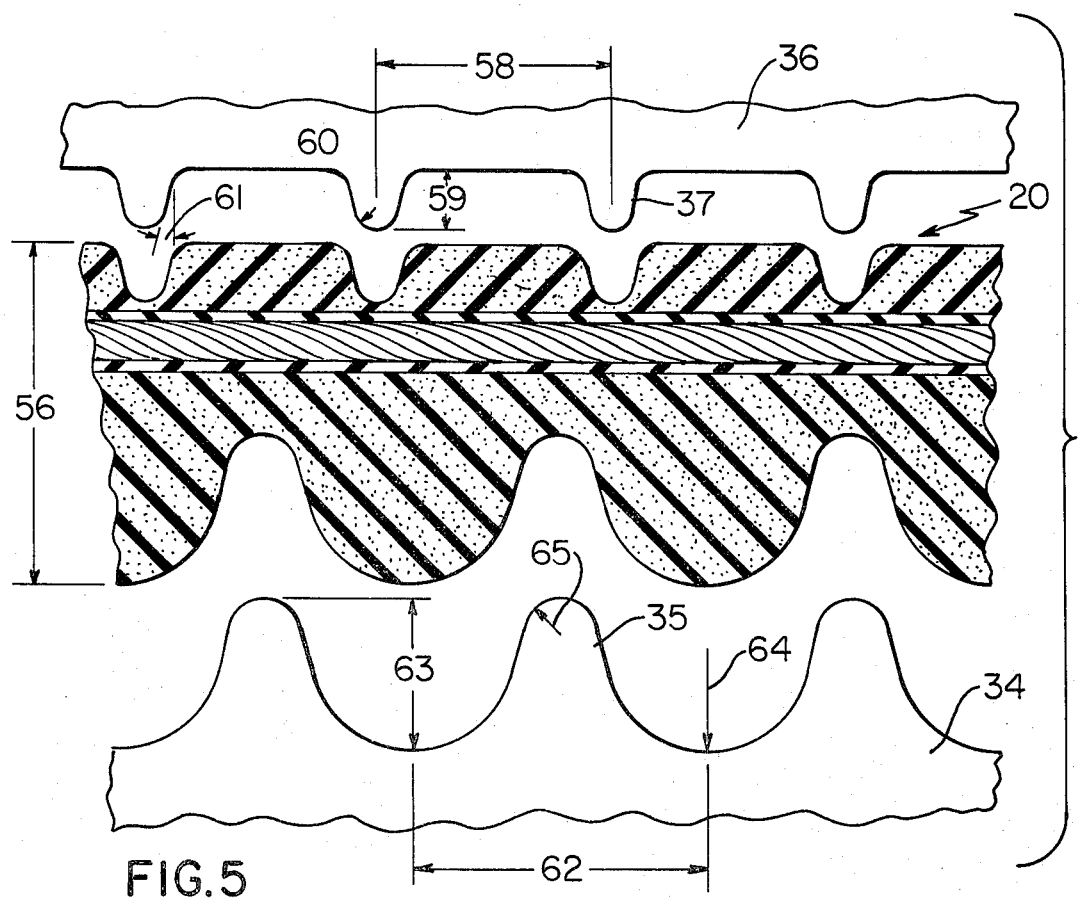

METHOD OF MAKING A TOP TOOTHED ENDLESS POWER TRANSMISSION BELT CONSTRUCTION AND A BELT CONSTRUCTION MADE BY SUCH METHOD

BACKGROUND OF THE INVENTION

1. Field of the Invention

This invention relates to a method of making a top toothed endless power transmission belt construction formed mainly of polymeric material as well as to a belt construction made by such method.

2. Prior Art Statement

It is known in the art of making a top toothed endless power transmission belt construction formed mainly of polymeric material to dispose the material in substantially cylindrical form on a substantially cylindrical drum-like support member, dispose a substantially cylindrical toothed member about the disposed material, and compress one of the members toward the other of the members with the pressure of pressurized steam to form top teeth in the material and cure the thus formed material into a top toothed belt construction.

For example, see the following U.S. patent:

(1) U.S. Pat. No. 4,106,966—Brooks

It had been found that it is necessary to eliminate the adverse effect of the expanded gas created in the heated polymeric material being formed by the method set forth in the above U.S. Pat. No. 4,106,966 in order to permit the outer collapsible toothed matrix thereof to fully form the top teeth during the compressing of the toothed matrix toward the inner support member by utilizing at least one layer of fabric or flocking material between the toothed matrix and the polymeric material to absorb such expanding gas and provide an escape path therefor.

It is also known in the belt making art wherein a relatively long endless belt construction is being formed with teeth in the top surface thereof by serially compressing and heating straight segments of the belt construction between forming flat plates, the top flat plate after initially compressing into the particular belt segment to partially form top teeth therein is backed off therefrom before that belt segment is cured in order to permit the expanded gas in the heated polymeric material of that segment to escape. Thereafter the top plate is again compressed against the respective belt segment to further form the teeth thereof and final cure that segment of the belt construction before the next segment of the belt construction is indexed between the flat forming plates.

SUMMARY OF THE INVENTION

It is one feature of this invention to provide an improved method of making a top toothed endless power transmission belt construction that is formed mainly of polymeric material.

In particular, as previously set forth, it was found in the past that when the method set forth in the U.S. Pat. No. 4,106,966 to Brooks is utilized, a costly layer of fabric or flock material is required to be included with the polymeric material that is being formed into the top toothed endless power transmission belt construction in order to eliminate the adverse effect of the gas in the polymeric material that is expanded by the curing heat of the process in order to permit the outer collapsible toothed matrix to fully form the top teeth in the polymeric material with the desired depth and contour thereof.

However, it was found according to the teachings of this invention that such layer of fabric or flock material could be eliminated in the above process if during the compressing of the toothed matrix into the polymeric material being utilized to form the belt construction such compressing is temporarily stopped by releasing the steam pressure on the toothed matrix before the polymeric material has been cured to permit the gas that has been initially heated and thereby expanded in the polymeric material to escape whereby the collapsible toothed matrix can be utilized to form the top teeth with the desired depth and contour thereof in a relatively inexpensive manner.

For example, one embodiment of this invention provides a method of making a top toothed endless power transmission belt construction formed mainly of polymeric material, the method comprising the steps of disposing the material in substantially cylindrical form on a substantially cylindrical drum-like support member, disposing a substantially cylindrical toothed member about the disposed material, compressing one of the members toward the other of the members with the pressure of pressurized steam to form top teeth in the material and cure the thus formed material with the heat of the steam into a top toothed belt construction, introducing pressurized steam against the other member during part of the time that the one member is being compressed toward the other member by the pressure of the pressurized steam, temporarily releasing the pressure on the one member before the polymeric material has been cured to permit the gas that has been initially heated and thereby expanded in the polymeric material to escape therefrom, and temporarily releasing the pressure against the other member at the same time that the pressure on the one member is released, the step of temporarily releasing the pressure against the other member ending after the step of temporarily releasing the pressure on the one member ends so that when the pressure on the one member is initially reapplied a maximum pressure differential exists across the one member and acts in a direction to compress the one member toward the other member for a period of time before the pressure on the other member is initially reapplied.

Accordingly, it is an object of this invention to provide an improved method of making a top toothed endless power transmission belt construction formed mainly of polymeric material, the method of this invention having one or more of the novel features of this invention as set forth above or hereinafter shown or described.

Another object of this invention is to provide a belt construction made by the method of this invention, the belt construction of this invention having one or more of the novel features of this invention as set forth above or hereinafter shown or described.

Other objects, uses and advantages of this invention are apparent from a reading of this description which proceeds with reference to the accompanying drawings forming a part thereof and wherein:

BRIEF DESCRIPTION OF THE DRAWINGS

FIG. 1 is a fragmentary perspective view, partially in cross section, illustrating one embodiment of the top toothed endless power transmission belt construction of this invention that has been made by the method of this invention.

FIG. 2 is an enlarged fragmentary cross-sectional view illustrating the method and apparatus of this invention for forming the belt construction of FIG. 1.

FIG. 3 is a reduced perspective view illustrating the outer toothed matrix and curing jacket utilized in the method and apparatus of FIG. 2.

FIG. 4 is a reduced schematic view illustrating the method and apparatus of this invention for compressing and curing the structure illustrated in FIG. 2 to form the belt construction of FIG. 1.

FIG. 4A is a reduced fragmentary cross-sectional view illustrating part of the structure of FIG. 2 disposed against a flat surface means.

FIG. 5 is an enlarged schematic view of the formed belt construction of this invention in cross section and illustrates the inner and outer toothed members of the structure of FIG. 2 in straight line form thereof and spaced from the belt construction.

FIG. 6 is a view similar to FIG. 1 and illustrates another embodiment of a belt construction made by the method of this invention.

DESCRIPTION OF THE PREFERRED EMBODIMENTS

Figure 7:
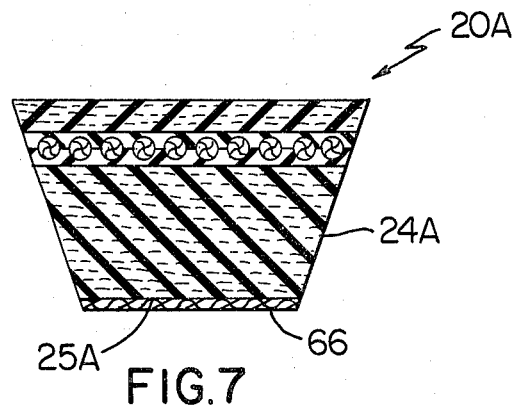
FIG. 7 is a cross-sectional view illustrating another embodiment of a belt construction formed by the method of this invention.

While the various features of this invention are hereinafter illustrated and described as being particularly adapted to provide a top toothed endless power transmission belt construction of the V-belt type, it is to be understood that the various features of this invention can be utilized singly or in various combinations thereof to provide top toothed belt constructions of other types.

Therefore, this invention is not to be limited to only the embodiments illustrated in the drawings, because the drawings are merely utilized to illustrate one of the wide variety of uses of this invention.

Referring now to FIG. 1, one embodiment of the improved top toothed endless power transmission belt construction of this invention of the V-belt type is generally indicated by the reference numeral 20 and while the belt construction 20 can have any suitable structure to provide teeth 21 in the top surface 22 thereof, the embodiment of the belt construction 20 illustrated in the drawings comprises a tension section 23 that defines the top surface 22 of the belt construction 20, a compression section 24 that defines a bottom surface 25 of the belt construction 20, and a load carrying or neutral axis section 26 disposed intermediate the tension section 23 and the compression section 24 in a conventional manner, the load carrying section 26 comprising a top cushion or layer 27 and a bottom cushion or layer 28 with a load carrying cord 29 helically wound therebetween in a manner well known in the belt construction art.

The belt sections 23, 24 and 26 and cord 29 are formed mainly of polymeric material and, if desired, at least one of the tension section 23 and the compression section 24 can be fiber loaded in a manner well known in the art as represented by the reference numeral 30 in FIGS. 1, 2 and 5 whereby it can be seen that both the tension section 23 and compression section 24 are illustrated as being fiber loaded in a manner well known in the art.

While any suitable polymeric material can be utilized for the belt sections 23, 24 and 26 and cord 29, the sections 23, 24 and 26 can comprise mainly neoprene with conventional fillers and binders as is conventional in the belt art and the cord 29 can comprise mainly a polyester material.

The teeth 21 of the tension section 23 of the belt construction 20 of this invention are formed so that the same have substantially flat tops 31, extend substantially transverse to the longitudinal axis of the belt construction 20 and are substantially uniform to each other while extending along the entire length of the top surface 22 thereof as illustrated, the teeth 21 sometimes being referred to as cogs.

Similarly, the compression section 24 of the belt construction 20 has a plurality of bottom teeth 32 that are substantially rounded, extend substantially transverse to the longitudinal axis of the belt construction 20, are substantially uniform to each other and extend along the entire length of the bottom surface 25 of the belt construction 20 as illustrated, the teeth 32 also sometimes being referred to as cogs.

Except for the unique features of this invention as will be apparent hereinafter, the belt construction 20 of this invention is made in the manner fully disclosed in the U.S. Pat. No. 4,106,966 to Brooks whereby such U.S. Pat. No. 4,106,966 is being incorporated into this disclosure by this reference thereto.

In particular, reference is now made to FIG. 2 of the drawings wherein the method and apparatus of this invention for forming the belt construction 20 is generally indicated by the reference numeral 33 and is of the type similar to the method and apparatus set forth in the aforementioned U.S. Pat. No. 4,106,966 which is utilized for producing double toothed belts, or as sometimes referred to as double cogged belts, and comprises an inner substantially cylindrical toothed matrix means or drum-like support member 34 having a plurality of longitudinally disposed teeth 35 and against which the inner polymeric layer 24 is wrapped in a manner well known in the art. Thereafter, the inner cushion layer 28 is wrapped on top of the layer 24 and then the load carrying cord 29 is helically wound on the inner cushion layer 28 under controlled tension conditions as is well known in the art and causes partial forcing of the inner layer 24 between the teeth 35 of the drum-like support member or matrix means 34 as illustrated in FIG. 2.

The outer cushion or layer 27 is then wrapped on top of the cord 29 and then the outer polymeric layer 23 is wrapped thereon.

An outer substantially cylindrical and collapsible toothed curing jacket and toothed matrix means 36 is telescopically disposed over the outer layer 23 so that the longitudinally disposed teeth 37 thereof engaged against the top surface 22 of the layer 23 as illustrated in FIG. 2, the outer collapsible curing jacket and toothed matrix means 36 being in the tubular form illustrated in FIG. 3 and being made by any one of the methods set forth in the aforementioned U.S. Pat. No. 4,106,966 as desired.

However, it is to be understood that the curing jacket and toothed matrix means 36 could comprise two separate parts one of which is a collapsible cylindrical outer curing sleeve and the other of which is an inner collapsible toothed matrix which when telescoped together defines structure similar to the curing jacket and toothed matrix means 36 and performs the same function thereof as will be hereinafter set forth.

In addition, it is to be understood that the inner drum-like member 34 could comprise a one-piece metal member as illustrated in FIG. 2 or could comprise a cylindrical inner metal drum having an outer toothed matrix disposed thereon as set forth in the aforementioned U.S. Pat. No. 4,106,966.

In any event, it can be seen that in the embodiment illustrated in the drawings, the drum-like member 34 is a support member while the outer curing jacket and toothed matrix means 36 is collapsible toward the support member 34 to form the belt construction 20 of this invention in a manner hereinafter set forth.

However, it is to be understood that the method of this invention as hereinafter set forth could be utilized to compress an inner member toward an outer stationary toothed matrix means or to compress both the inner and outer member toward each other as desired to form a top toothed endless power transmission belt construction.

The inner drum-like support member 34 is conventionally formed with notiches across the opposed ends thereof so that a fluid passage means will be created across the same at the ends of the drum-like member 34 when the member 34 is disposed against a flat surface.

For example, reference is made to FIG. 4A wherein one of the opposed ends of the drum-like member 34 is indicated by the reference numeral 38 and is disposed against a flat surface 39, the end 38 of the drum-like support member 34 having a plurality of notches 40 in the end 38 thereof which provides fluid communication between the opposed sides 41 and 42 of the drum-like member 34 at the opposed ends 38 thereof for a purpose now to be described.

After the assembly 33 of FIG. 2 has been formed in the manner previously described, the unit 33 is then disposed in a curing apparatus or device 43 in the manner illustrated in FIG. 4 wherein the bottom 44 of the unit 33 is disposed against the bottom surface 45 of the apparatus 43 while a cover plate 46 is disposed against the upper end 47 of the unit 33 whereby the upper end 47 of the unit 33 is closed from an internal chamber 48 of the apparatus 43 by the top plate 46 and the bottom wall 45 closes off the bottom end 44 of the unit 33 from the internal chamber 48 of the curing apparatus 43.

However, an internal chamber 49 is formed inside the unit 33 as defined by the internal peripheral surface 50 of the drum-like member 34 cooperating with the bottom wall 45 of the apparatus 43 and the cover plate 46 whereby such internal chamber 49 is separated from the internal chamber 48 that surrounds the unit 33, the internal chamber 49 being in fluid communication with the area between the two matrix means 36 and 34 of the unit 33 by the aforementioned notches 40 in the opposed ends 38 of the support member 34. The area between the matrix means 34 and 36 is generally indicated by the reference numeral 51 in FIG. 2 and contains the belt construction or belt sleeve that is generally indicated by the reference numeral 52 in FIG. 2.

The teeth forming and curing of the belt construction or sleeve 52 in the apparatus 43 is achieved by introducing steam under pressure as indicated by the arrows 53 in FIG. 4 into and out of the chamber 48 of the apparatus 43, the pressure of the steam 53 in the chamber 48 being such that it causes the curing jacket and toothed matrix means 36 to collapse toward the drum-like support member 34 whereby the teeth 37 of the curing jacket and matrix means 36 embed into the belt sleeve 52 and define the toothed outside or top surface 22 thereof as well as cause the belt construction or sleeve 52 to embed into the teeth 35 of the drum-like support member 34 to form the bottom teeth 32 in the inside or bottom surface 25 thereof.

Also, steam as indicated by the arrows 54 in FIG. 4, which is a lower pressure than the steam 53, is introduced within the chamber 49 of the unit 33 through the bottom wall 45 of the apparatus 43 for causing substantial heating within the unit 33 and thereby curing of the belt sleeve 52 from its inside portion outwardly to supplement the curing from the outside portion of the sleeve 52 inwardly as provided by the heat from the high pressure steam 53 in the chamber 48.

Thus, it can be seen that as the outer curing jacket and toothed matrix means 36 collapses toward the inner drum-like support member 34, not only do the teeth 37 of the collapsible curing jacket and matrix means 36 begin to form the top teeth 21 of the belt sleeve 52, but also the teeth 35 of the inner drum-like member 34 begin to form the bottom teeth 32 while the belt sleeve 52 begins to be cured by the heat provided by the steam 53 and 54 in the manner fully set forth in the aforementioned U.S. Pat. No. 4,106,966.

However, because of the heating of the belt sleeve 52 by the steam 53 and 54, gas evolves from the material of the belt sleeve 52 in an expanded manner to tend to retard the proper movement of the teeth 37 of the curing jacket and matrix means 36 into the layer 23 of the belt sleeve 52 as well as the teeth 35 of the drum-like member 34 into the layer 24 of the belt sleeve 52.

In the past, such expanding gas was permitted to escape or flow to the internal chamber 49 of the unit 33 from the space 51 between the matrix means 36 and 34 by utilizing the aforementioned layer of fabric or flock material between the forming teeth 37 on the curing jacket and matrix means 36 and the surface 22 of the layer 23, such as by having the layer of fabric or flock material secured on the surface 22 of the layer 23 or forming part of the contacting surface of the matrix means 36, whereby such fabric or flock layer is believed to partially absorb the expanding gases and provide a flow path to the notches 40 in the ends 38 of the drum-like member 34 so that the gases could reach the internal chamber 49 and thereby not impede the tooth forming operation of the curing jacket and matrix means 36 and drum-like member 34.

As previously stated, such application of a layer of fabric or flock material not only is a relatively costly operation but the same does not provide relatively smooth teeth 21 on the belt construction 20.

Accordingly, it was found according to the teachings of this invention, that the pressure being imposed by the steam 53 on the curing jacket 36, as well as the pressure of the steam 54 being imposed in the chamber 49 of the unit 33 and, thus, in the space 51 between the matrix means 36 and 34 should be temporarily released after an initial compressing period wherein the adverse expanded gases have been produced through the heating of the material of the belt sleeve 52 but before any substantially curing thereof, such as in one example it was believed to be before approximately 1% of the state of cure of the material of the belt sleeve 52 had occurred, so that the expanded gases could escape from the area 51 between the matrix means 34 and 36 through the notches 40 in the ends 38 of the drum-like member 34 to the chamber 49 and be exhausted from the chamber 49 if the chamber 49 were vented to atmosphere at that time.

It was also found according to the teachings of this invention that after a certain time period has elapsed to permit the expanded gases to escape from the belt sleeve 52 in the above manner, the pressure of the steam 53 in the chamber 48 could then be reapplied to cause the curing jacket and toothed matrix means 36 to again be collapsed toward the drum-like member 34 and further form the teeth 21 and 32 respectively in the top surface 22 and bottom surface 25 of the sleeve 52 as well as final cure the thus formed belt construction or sleeve 52 in combination with a reapplied steam 54 in the chamber 49 of the unit 33.

However, when the pressure of the steam 53 is reapplied in the chamber 48 to cause the curing jacket and toothed matrix means 36 to again collapse toward the drum-like member 34, it was found according to the teachings of this invention that the pressure of the steam 54 should not be reapplied at that same time but should be reapplied after another period of time has elapsed in order to permit a maximum pressure differential to exist and act across the curing jacket and toothed matrix means 36 to cause the same to have a time period of compressing against the belt sleeve 52 with such maximum pressure before the pressure of the steam 54 is reapplied to the chamber 49 and, thus, in the area 51 between the matrix means 36 and 34 which reduces the effective pressure differential acting across the collapsible matrix means 36.

The heat from the reapplied steam 53 and 54 subsequently cures the belt sleeve 52 in the final toothed configuration thereof that has been provided by the collapsible curing jacket and toothed matrix means 36 having compressed the belt sleeve 52 in such a manner that the belt sleeve 52 has the teeth 37 and 35 fully embedded therein to produce the configuration illustrated in FIG. 1, as well as in FIG. 5, as will be apparent hereinafter.

The thus cured belt sleeve 52 is removed from unit 33 by having the curing jacket 36 suitably separated from the belt sleeve 52 so that the curing jacket 36 can be used again in a similar manner as described previously. The belt sleeve 52 and inner drum-like member 34 are then suitably cooled, such as by submerging in cold tap water. Then the belt sleeve 52 is suitably removed from the inner drum-like member 34 and is cut into the individual narrower belt constructions 20 in a manner well known in the art wherein each belt construction 20 has the generally trapezoidal cross-sectional configuration as illustrated in FIG. 1 wherein angled driving sides 55 are provided for the belt construction 20 and cooperate with the top and bottom surfaces 22 and 25 thereof to define the generally trapezoidal cross-sectional configuration that is conventional in the art for V-belt constructions.

Therefore, it can be seen that it is a relatively simple method of this invention to form the belt construction 20 without the use of the prior known layer of fabric or flock material and with smooth top teeth 21 by merely temporarily releasing the pressure on the collapsible toothed matrix means 36 before the polymeric material of the belt construction being formed therefrom has been cured to permit the gas that has been initially heated and thereby expanded in the polymeric material to escape therefrom.

While the following example of the method of this invention is given for forming a particular belt construction 20, it is to be understood that the various dimensions, periods of time, pressures, etc., hereinafter set forth are not to be a limitation on this invention, but are merely given as examples for forming a typical belt construction 20.

In particular, reference is now made to FIG. 5 wherein the belt construction 20 of this invention is illustrated in a straight length thereof and the outer and inner toothed matrix means 36 and 34 are also shown in straight line complementary relation to the formed belt construction 20.

When the completely formed belt construction 20 has a thickness as represented by the dimension arrow 56 in FIG. 5 of approximately 0.444 of an inch, the pitch of the teeth 37 of the matrix means 36 as represented by the dimension arrow 58 is approximately 20/64ths of an inch while the length of the teeth 37 as represented by the dimension arrow 59 is approximately 5/64ths of an inch. The radius of the tips of the teeth 37 of the matrix means 36 is represented by the radius arrow 60 and is approximately 1/32nd of an inch and the angle of the teeth 37 as represented by the reference numeral 61 is approximately 15°.

In regards to the drum-like support member 34 in FIG. 5, the pitch of the teeth 35 thereof is represented by the dimension arrow 62 and is approximately 25/64ths of an inch while the depth or length of the teeth 35 as represented by the dimension arrow 63 is approximately 13/64ths of an inch. The radius arrow 64 for defining the valleys between the teeth 35 of the matrix means 34 is approximately 9/64ths of an inch while the radius arrow 65 for forming the tips of the teeth 35 is represented by the reference numeral 65 and is approximately 3/64ths of an inch.

Utilizing such dimensioned matrix means 34 and 36 to form the belt construction 20 having the aforementioned final thickness 56 of approximately 0.444 of an inch, the apparatus 43 is so controlled that the higher pressure steam 53 initially is directed into the chamber 48 to pressurize the same at approximately 130 psi for approximately ten minutes while the lower pressure steam 54 simultaneously is directed into the chamber 49 to pressurize the same at approximately 65 psi for that same ten minute period. Thereafter, the pressure in the chamber 48 and the pressure in the chamber 49 is relieved by respectively interconnecting the chambers 48 and 49 to atmosphere. The chamber 48 is interconnected to the atmosphere for approximately two minutes and then the higher pressure steam 53 is again interconnected thereto to maintain the chamber 48 at a pressure of approximately 130 psi to final cure the belt construction or belt sleeve 52 for a period of approximately 33 minutes. However, the lower pressure steam 54 is not interconnected to the chamber 49 until after approximately five minutes from the time the same was vented to atmosphere. At this time, the steam 54 again pressurizes the chamber 49 at a pressure of approximately 65 psi for approximately 28 minutes at which time both the higher pressure steam 53 and lower pressure steam 54 are respectively disconnected from the chambers 48 and 49 to permit the chambers 48 and 49 to return to atmospheric conditions so that the unit 33 then can be subsequently cooled in the manner previously set forth. It was found that this time sequence provides an optimum cure for the belt construction or belt sleeve 52 which is equivalent to an optimum state of cure of approximately 35 minutes at approximately 285° F.

While the various features of this invention have heretofore been set forth as forming teeth on both the top and bottom of the belt construction 20, it is to be understood that the bottom of the belt construction 20 could be flat or formed in another configuration by other structure if desired while the top teeth 21 thereof are formed in a manner previously described by the method of this invention. Of course, the top teeth 21 could have configurations other than flat, if desired.

For example, reference is now made to FIG. 6 wherein another belt construction of this invention is generally indicated by the reference numeral 20A and parts thereof similar to the belt construction 20 are indicated by like reference numerals followed by the reference letter "A."

As illustrated in FIG. 6, it can be seen that the belt construction 20A has the top teeth 21A formed in the same manner as the teeth 21 previously described for the belt construcon 20 while the bottom surface 25A of the belt construction 20A is substantially flat and non-toothed as illustrated.

Figure 8:
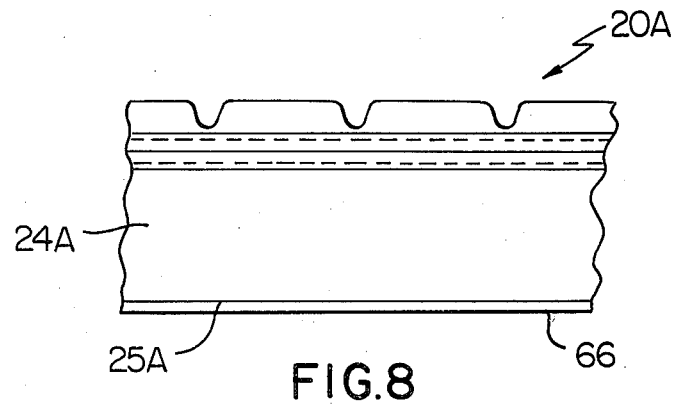
FIG. 8 is a fragmentary side view of the belt construction of FIG. 7.

If desired, the belt construction 20A could be provided with a layer of fabric on the bottom surface 25A thereof as illustrated by the reference numeral 66 in FIGS. 7 and 8 and in a manner well known in the art.

Also, it is to be understood that the compression section 24 of the belt construction 20 of this invention can be formed with a plurality of rubber impregnated fabric layers if desired.

Figure 9:
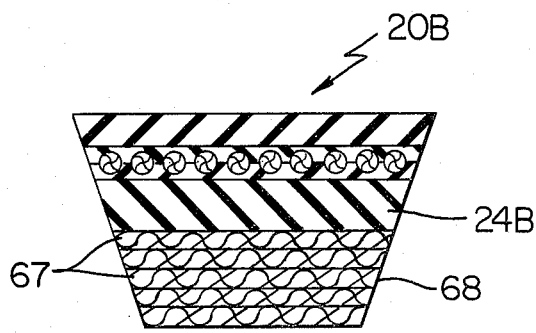
FIG. 9 is a view similar to FIG. 7 and illustrates another embodiment of a belt construction made by the method of this invention.
Figure 10:
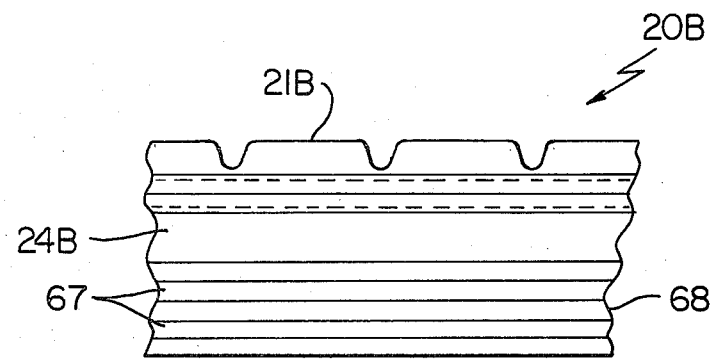
FIG. 10 is a fragmentary side view of the belt construction of FIG. 9.

For example, reference is now made to FIGS. 9 and 10 wherein another belt construction of this invention is generally indicated by the reference numeral 20B and parts thereof similar to the belt constructions 20 and 20A are indicated by like reference numerals followed by the reference letter "B."

As illustrated in FIGS. 9 and 10, the belt construction 20B has the top teeth 21B formed therein in the manner previously described while the compression section 24B thereof has a plurality of layers 67 of rubber impregnated fabric building up the lower portion 68 thereof in a manner well known in the belt construction art.

Therefore, it can be seen that this invention is not limited to any particular configuration of the compression section thereof nor to any particular configuration of the load carrying section thereof as long as the tension section thereof is provided with teeth in the manner previously set forth.

In particular, it can be seen that one embodiment of the method of this invention for making a top toothed endless power transmission belt construction formed mainly of polymeric material comprises the steps of disposing the material in substantially cylindrical form on a substantially cylindrical drum-like support member, disposing a substantially cylindrical and collapsible toothed matrix means about the disposed material, initially compressing the toothed matrix means toward the inner support member with pressurized steam for a first period of time that heats the gas in the polymeric material to expand the gas before the curing of the polymeric material, thereafter releasing the pressure on the toothed matrix means for a second period of time to permit the expanded gas to escape from the polymeric material, and then again compressing the toothed matrix means toward the inner support member with the pressurized steam for a third period of time to final form the top teeth and cure the thus formed top toothed belt construction.

Therefore, it can be seen that this invention not only provides an improved method of making a top toothed endless power transmission belt construction that is formed mainly of polymeric material, but also this invention provides a belt construction made by such a method.

While the forms and methods of this invention now preferred have been illustrated and described as required by the Patent Statute, it is to be understood that other forms and method steps can be utilized and still fall within the scope of the appended claims.

What is claimed is:

1. In a method of making a top toothed endless power transmission belt construction formed mainly of polymeric material and comprising the steps of disposing said material in substantially cylindrical form on a substantially cylindrical drum-like member, disposing a substantially cylindrical toothed member about said disposed material, and compressing at least one of said members toward the other of said members with the pressure of pressurized steam to form top teeth in said material and cure the thus formed material with the heat of said steam into a top toothed belt construction, the improvement comprising the steps of introducing pressurized steam against said other member during part of the time that said one member is being compressed toward said other member by said pressure of said pressurized steam, temporarily releasing said pressure on said one member before said polymeric material has been cured to permit the gas that has been initially heated and thereby expanded in said polymeric material to escape therefrom, and temporarily releasing the pressure against said other member at the same time that said pressure on said one member is released, said step of temporarily releasing the pressure against said other member ending after said step of temporarily releasing the pressure on said one member ends so that when said pressure on said one member is initially reapplied a maximum pressure differential exists across said one member and acts in a direction to compress said one member toward said other member for a period of time before said pressure on said other member is initially reapplied.

2. A method as set forth in claim 1 and including the step of providing passage means from between said members to outside said other member through which said expanded gas escapes.

3. A method as set forth in claim 2 and including the step of venting the outside of said other member to the atmosphere when the pressure againt said other member is temporarily released.

4. A method as set forth in claim 1 wherein said step of temporarily releasing the pressure against said other member begins substantially at the same time as said step of temporarily releasing the pressure on said one member begins.

5. A method as set forth in claim 1 and including the step of providing said drum-like member with another toothed member that forms bottom teeth in said material during said step of compressing said one member toward said other member whereby said belt construction is a double toothed belt construction.

6. A method as set forth in claim 1 and including the step of thereafter cutting said belt construction into a plurality of narrower belt constructions.

7. A method as set forth in claim 1 and including the step of fiber loading at least the part of said polymeric material that forms said top teeth.

8. A method as set forth in claim 1 and including the step of fiber loading at least the part of said polymeric material that forms the tension section of said belt construction.

9. A method as set forth in claim 1 and including the steps of forming said drum-like member to be a support member, and forming said toothed member to be a collapsible toothed matrix whereby said one member comprises said collapsible toothed matrix and said other member comprises said support member.

10. In a method of making a top toothed endless power transmission belt construction formed mainly of polymeric material and comprising the steps of disposing said material in substantially cylindrical form on a substantially cylindrical drum-like support member, disposing a substantially cylindrical collapsible toothed matrix means about said disposed material, and compressing said toothed matrix means toward said inner support member with the pressure of pressurized steam applied against said matrix means to form top teeth in said material and cure the thus formed material with the heat of said steam into a top toothed belt construction, the improvement wherein said step of compressing comprises the steps of initially compressing said matrix means toward said inner support member with said pressurized steam for a first period of time that heats the gas in said polymeric material to expand the gas before the curing of said polymeric material, introducing pressurized steam inside said support member during said first period of time, thereafter releasing said pressure on said matrix means and inside said support member for a second period of time to permit said expanded gas to escape from said polymeric material, then again compressing said matrix means toward said inner support member with said pressurized steam for a third period of time to final form said top teeth and cure the thus formed top toothed belt construction, and then again introducing said pressurized steam inside said support member during said third period of time, said step of again introducing said steam inside said support member beginning after said step of again compressing said matrix means so that when said pressure on said matrix means is initially reapplied a maximum pressure differential exists across said matrix means and acts in a direction to compress said matrix means toward said support member for a period of time before said pressure inside said support member is reapplied.

11. A method as set forth in claim 10 wherein said step of releasing said pressure on said matrix means and inside said support member begins before said polymeric material has been cured about one percent thereof.

12. A method as set forth in claim 10 and including the step of providing passage means from between said matrix means and said support member to inside said support member through which said expanded gas escapes.

13. A method as set forth in claim 12 and including the step of venting the inside of said support member to the atmosphere when the pressure inside said support member is temporarily released.

14. A method as set forth in claim 10 wherein said step of temporarily releasing the pressure inside said support member begins substantially at the same time as said step of temporarily releasing the pressure on said matrix means begins.

15. A method as set forth in claim 10 and including the step of providing said inner support member with another toothed matrix means that forms bottom teeth in said material during said step of compressing the first-mentioned matrix means toward said inner support member whereby said belt construction is a double toothed belt construction.

16. A method as set forth in claim 10 and including the step of thereafter cutting said belt construction into a plurality of narrower belt constructions.

17. A method as set forth in claim 10 and including the step of fiber loading at least the part of said polymeric material that forms said top teeth.

18. A method as set forth in claim 10 and including the step of fiber loading at least the part of said polymeric material that forms the tension section of said belt construction.

* * * * *